United States Patent
Filho et al.

(10) Patent No.: US 10,112,701 B2
(45) Date of Patent: Oct. 30, 2018

(54) AIRCRAFT LANDING GEAR DOOR ACTUATION MECHANISM WITH INTEGRATED EMERGENCY ACTUATION ASSEMBLY

(71) Applicant: EMBRAER S.A., São José dos Campos, São Paulo (BR)

(72) Inventors: Carlos Rogulski Filho, São Paulo (BR); David Dias Ferraz, São Paulo (BR); Graco Tognozzi Lopes, São Paulo (BR); Arilton Nunes De Mattos, São Paulo (BR); Claudio De Martino, São Paulo (BR)

(73) Assignee: EMBRAER S.A., São José dos Camps-SP (BR)

( * ) Notice: Subject to any disclaimer, the term of this patent is extended or adjusted under 35 U.S.C. 154(b) by 550 days.

(21) Appl. No.: 14/851,182

(22) Filed: Sep. 11, 2015

(65) Prior Publication Data

US 2017/0073063 A1  Mar. 16, 2017

(51) Int. Cl.
*B64C 25/00* (2006.01)
*B64C 25/16* (2006.01)
(Continued)

(52) U.S. Cl.
CPC .............. *B64C 25/16* (2013.01); *B64C 25/10* (2013.01); *B64C 25/30* (2013.01); *B64C 2025/125* (2013.01)

(58) Field of Classification Search
CPC ......... B64C 25/10; B64C 25/16; B64C 25/30; B64C 2025/125
See application file for complete search history.

(56) References Cited

U.S. PATENT DOCUMENTS 2,752,112 A * 6/1956 Payne, Jr. ............... B64C 25/10
                                                          244/102 R
2,772,060 A * 11/1956 Bendicsen .............. B64C 25/16
                                                          244/102 R
(Continued)

FOREIGN PATENT DOCUMENTS

CA       2823082 A1 *  3/2014 ............. B64C 25/12
GB       1455560 A  * 11/1976 ............. B64C 25/16

*Primary Examiner* — Tien Q Dinh
*Assistant Examiner* — Aaron M Rodziwicz
(74) *Attorney, Agent, or Firm* — Nixon & Vanderhye P.C.

(57) ABSTRACT

Landing gear doors may be opened in an emergency event, e.g., a failure of the normal landing gear actuation system that requires a gravity free-fall deployment. The retractable aircraft landing gear door actuation mechanism will include a landing gear door and a door support bracket attached to the landing gear door. The support bracket is attached to aircraft structure for pivotal movement about a pivot axis between a closed condition whereby the landing gear door covers an aircraft landing gear when retracted relative to the aircraft structure, and an opened condition whereby the landing gear door is moved laterally and upwardly relative to the aircraft landing gear when extended relative to the aircraft structure. A gear door actuation assembly is operatively connected to the door support bracket for moving the door support bracket and the gear door supported thereby between the closed and opened conditions thereof. The gear door actuation assembly will include an over-the-center spring assembly which assists in pivotal movement of the door support bracket and the gear door supported thereby from the closed condition into the opened condition thereof.

8 Claims, 4 Drawing Sheets

(51) Int. Cl.
  *B64C 25/30*  (2006.01)
  *B64C 25/10*  (2006.01)
  *B64C 25/12*  (2006.01)

(56) References Cited

U.S. PATENT DOCUMENTS

| | | | | |
|---|---|---|---|---|
| 2,869,806 A * | 1/1959 | Beach | ............ | B64C 25/16 244/102 R |
| 3,647,166 A * | 3/1972 | Riedl | ............ | B64C 25/16 244/102 A |
| 5,590,851 A * | 1/1997 | Ackerman | ............ | B64D 11/003 220/264 |
| 7,178,759 B2 * | 2/2007 | Rouyre | ............ | B64C 25/16 244/100 R |
| 7,243,880 B2 * | 7/2007 | White | ............ | B64C 25/16 244/102 R |
| 7,651,053 B2 * | 1/2010 | Fort | ............ | B64C 7/00 244/102 R |
| 2005/0194496 A1 | 9/2005 | White | | |
| 2015/0069178 A1 * | 3/2015 | Brown | ............ | B64C 25/12 244/102 R |
| 2015/0151832 A1 * | 6/2015 | Filho | ............ | B64C 25/30 244/102 R |

* cited by examiner

AIRCRAFT LANDING GEAR DOOR ACTUATION MECHANISM WITH INTEGRATED EMERGENCY ACTUATION ASSEMBLY

FIELD

The embodiments disclosed herein relate generally to aircraft landing gear door actuation mechanisms, especially aircraft landing gear door actuation mechanisms provided with an emergency actuation system.

BACKGROUND

Aircraft with retractable landing gear are typically provided with retractable landing gear doors that operate synchronously with the landing gear for movement between open and closed conditions in response to landing gear extension and retraction cycles, respectively. Conventional landing gear doors must therefore be equipped with an actuation system or mechanism that open and close the doors during normal landing gear extension and retraction cycles, respectively (i.e., so that the gear doors are moved into an open condition out of potential physical contact with the landing gear during a gear extension cycle and moved into a closed condition covering the landing gear once the gear has been retracted during a retraction cycle).

There are two general classes of aircraft landing gear door actuation systems, namely (1) door actuation systems which are linked to the landing gear, and (2) door actuation systems having their own dedicated actuation system separate from the actuation system of the landing gear. Door actuation systems having their own dedicated actuation system must also be equipped with a dedicated extension system to allow the doors to open/close in the event of a failure of the landing gear actuation system. Thus, such door actuation systems must also be provided with a back-up system to allow the gear doors to open in order to allow the landing gear to extend in a gravity free-fall condition (e.g., a situation in which the landing gear extension is activated only by means of gravity without the aid of the normal on-board electric and/or hydraulic gear extension mechanisms.

Various emergency landing gear door operating mechanisms are known in the art, e.g., as evidenced by U.S. Pat. No. 9,102,403, U.S. Pat. No. 7,178,759 and US Patent Application Publication No. 2005/0194496 (the entire content of each being expressly incorporated hereinto by reference). There are, however, certain situations where the emergency landing door system needs to physically lift the landing gear door during a door opening operational cycle. For example, landing gear doors of cargo aircraft that have the door articulation axis close to the ground need to operate with a relative lifting movement in order to open the door and place it in a higher position thereby protecting the door from debris or contact with the ground should a hard landing event occur or a landing when the aircraft is in a roll attitude.

As noted above, landing gear door mechanisms having an independent actuation system require a back-up system in order to allow the landing gear door to open in the event of normal actuation system failure. In such a case, the back-up system for landing gear doors that require a relative lifting motion during the opening cycle needs to generate enough force to open and lift the door into its opened condition. Once opened, the system needs to also provide enough force maintain the door in an opened condition during various standard and non-standard landing events, e.g., a hard landing event. The force required to open and maintain the door in an opened condition can be generated by many means as compressed gas (e.g., air or nitrogen), air springs, pyrotechnic devices, aerodynamic or mechanical springs. In those cases whereby the landing gear doors need to be lifted into an opened condition, the system thus needs to generate even greater force so as to support the weight of the door weight and maintain it a locked and opened condition.

It is therefore towards providing solutions to the problems associated with emergency landing gear door actuation as noted above that the embodiments of the present invention are directed.

SUMMARY

In general, the invention as embodied in the systems described herein allow for the landing gear doors to be opened in an emergency event, e.g., a failure of the normal landing gear actuation system that requires a gravity free-fall deployment. According to some embodiments, the retractable aircraft landing gear door actuation mechanism will include a landing gear door and a door support bracket attached to the landing gear door. The support bracket is attached to aircraft structure for pivotal movement about a pivot axis between a closed condition whereby the landing gear door covers an aircraft landing gear when retracted relative to the aircraft structure, and an opened condition whereby the landing gear door is moved laterally and upwardly relative to the aircraft landing gear when extended relative to the aircraft structure. A gear door actuation assembly is operatively connected to the door support bracket for moving the door support bracket and the gear door supported thereby between the closed and opened conditions thereof. The gear door actuation assembly will include an over-the-center spring assembly which assists in pivotal movement of the door support bracket and the gear door supported thereby from the closed condition into the opened condition thereof.

According to some embodiments, the gear door actuation assembly will include first and second linkage arms, an actuator assembly and a tension spring assembly. The first linkage arm is pivotally connected at a proximal end thereof to the aircraft structure at a first pivot axis and is pivotally connected at a distal end thereof to a proximal end of the second linkage arm at a second pivot axis. The second linkage arm is in turn pivotally connected at a distal end thereof to the gear door support structure at a third pivot axis. The actuator assembly has a proximal end pivotally connected to the aircraft structure at a fourth pivot axis and a distal end pivotally connected to the first linkage arm at a fifth pivot axis between the first and second pivot axes thereof. The tension spring assembly has a proximal end pivotally connected to the aircraft structure at a sixth pivot axis and a distal end pivotally connected to the first linkage arm at a seventh pivot axis positioned inboard of the fifth pivot axis.

The tension spring assembly will be loaded with a tension force when the gear door support bracket and the gear door supported thereby is in the closed condition thereof. In such a manner, therefore, actuation of the actuator assembly pivotally drives the first linkage arm about the first pivot axis to cause the second linkage arm to drive the door support bracket and the gear door supported thereby to pivot laterally and outwardly relative to the relative to the aircraft landing gear and into the opened condition thereof. Such movement of the door support bracket and the gear door supported thereby responsively moves the seventh pivot axis over center of the fifth pivot axis to thereby cause the force of the tension spring assembly to unload and assist in movement of the door support bracket and the gear door supported thereby into the opened condition thereof.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 2:
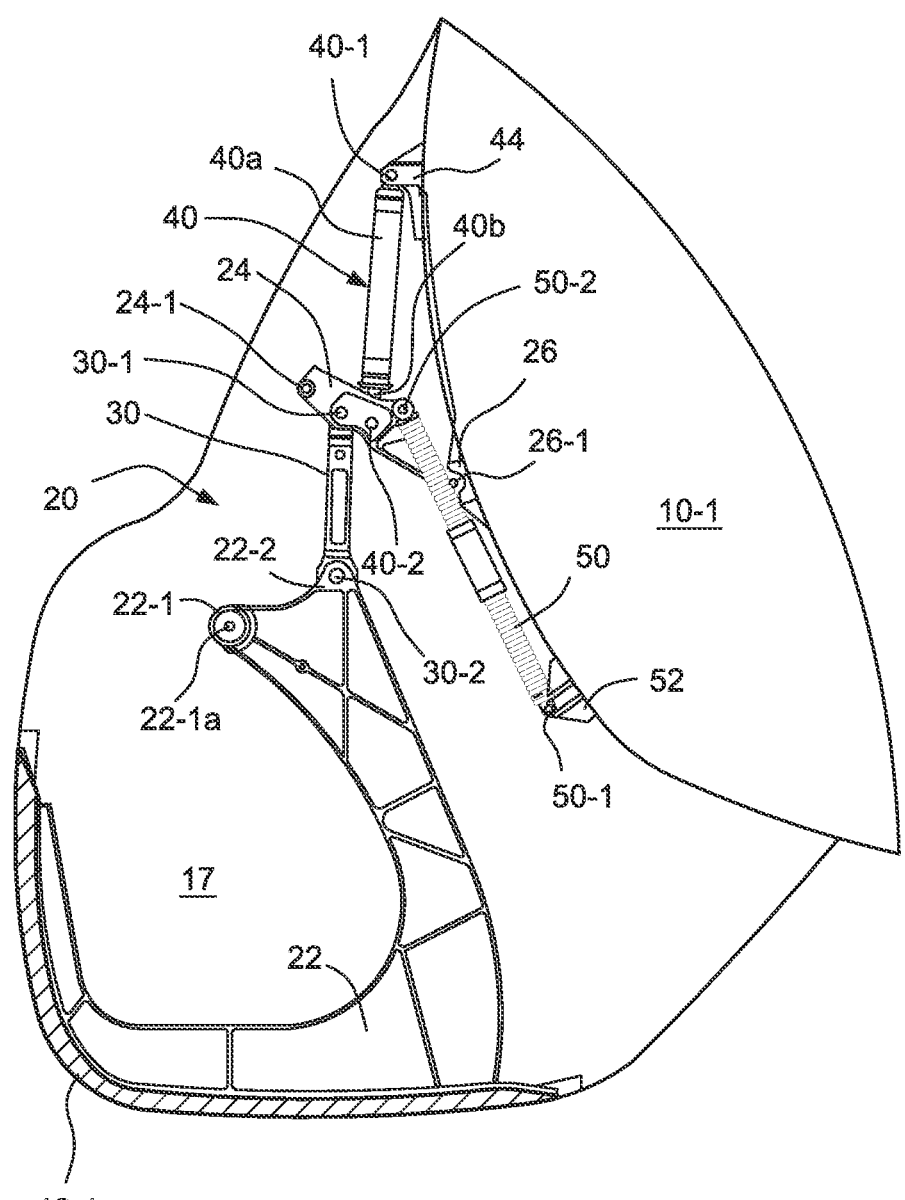
FIG. 2 is an enlarged cross-sectional aftward elevational view of an exemplary starboard landing gear door in a closed condition having a door operating system in accordance with an embodiment of the invention herein which is provided in the aircraft shown in FIG. 1.
Figure 3:
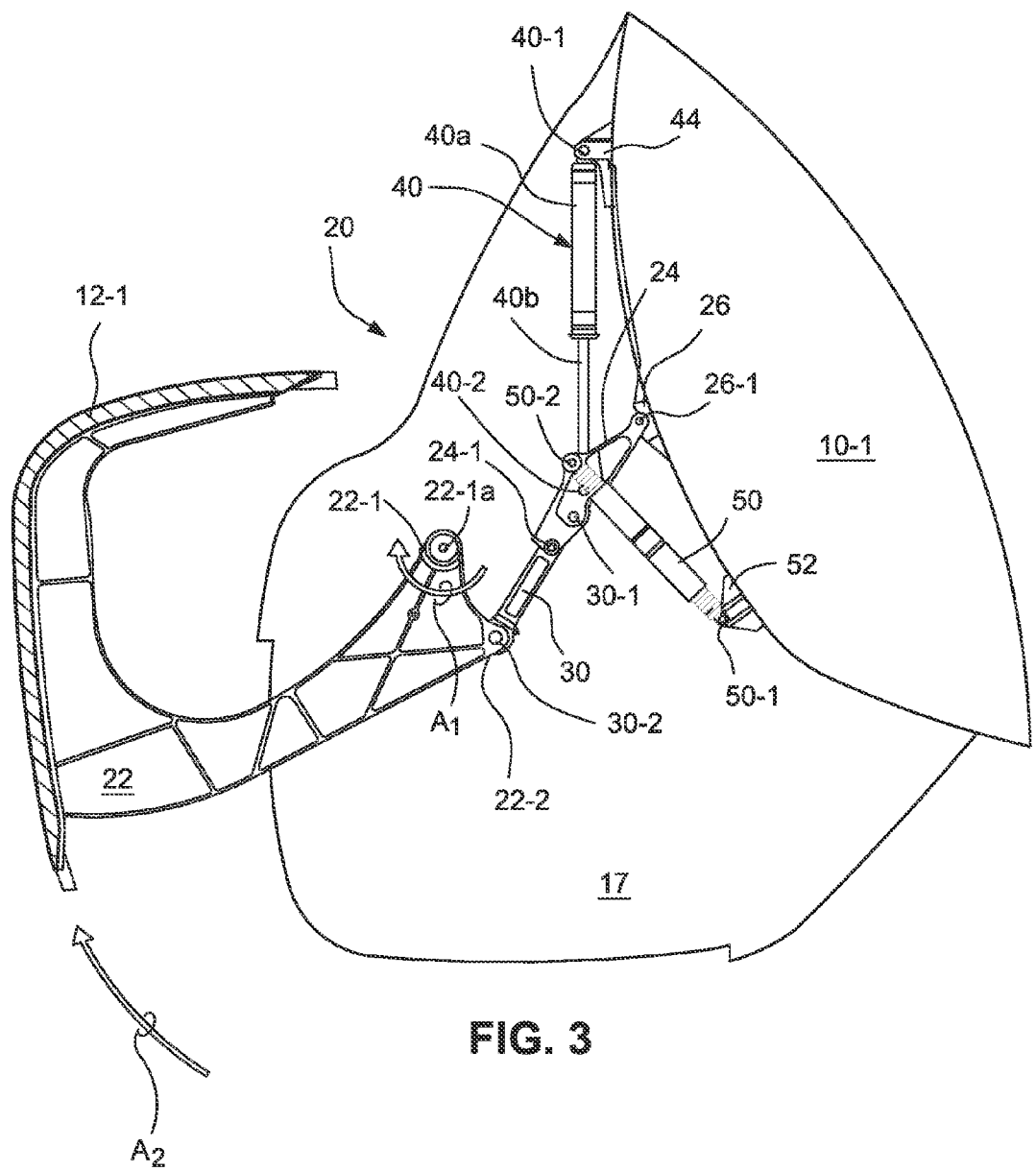
FIG. 3 is an enlarged cross-sectional aftward elevational view of the starboard landing gear door and door operating system of FIG. 2 but shown in an opened condition.
Figure 4:
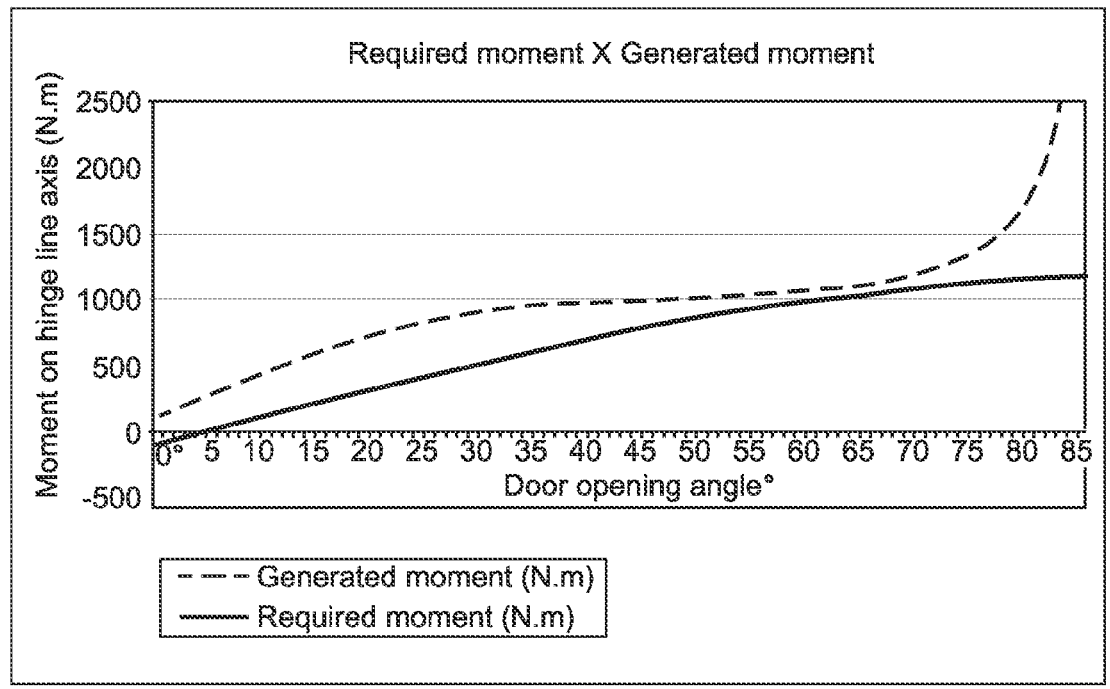
Figure 5:
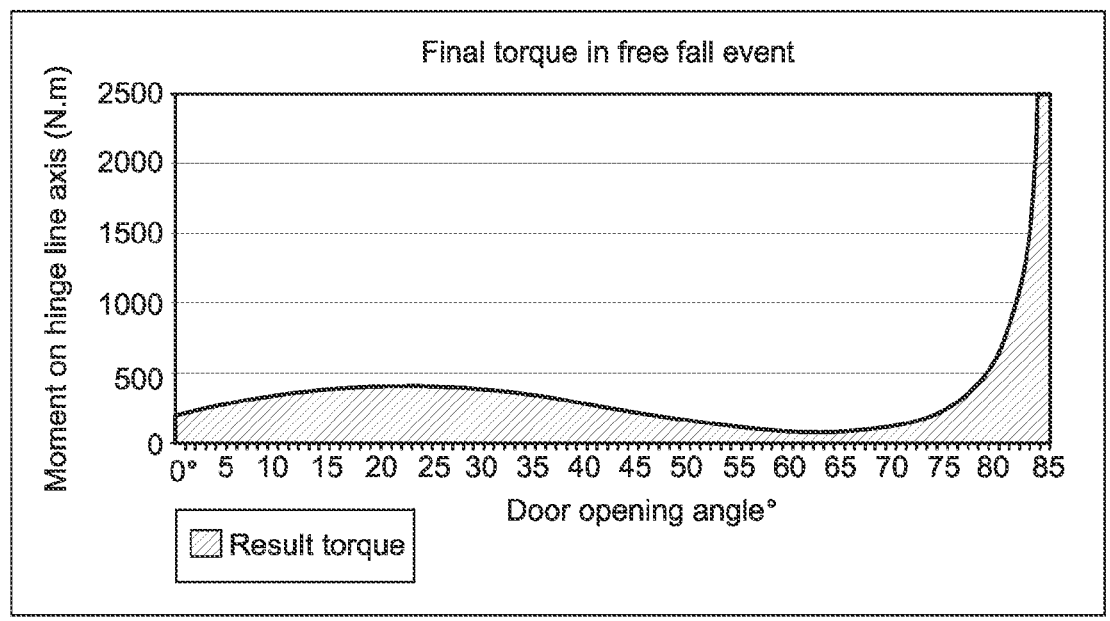

FIG. 4 is a graph of the moment on the hinge line axis (N·m) versus the gear door opening angle (°) for the generated moment achieved by the door opening system shown in FIGS. 2 and 3 above (dashed line) and the required moment for the door to open (solid line); and FIG. 5 is a graph of the moment on the hinge line axis (N·m) versus the gear door opening angle (°) during a landing gear free fall event showing the resultant positive torque achieved by the door opening system according to the embodiments depicted in FIGS. 2 and 3.

DETAILED DESCRIPTION

Figure 1:
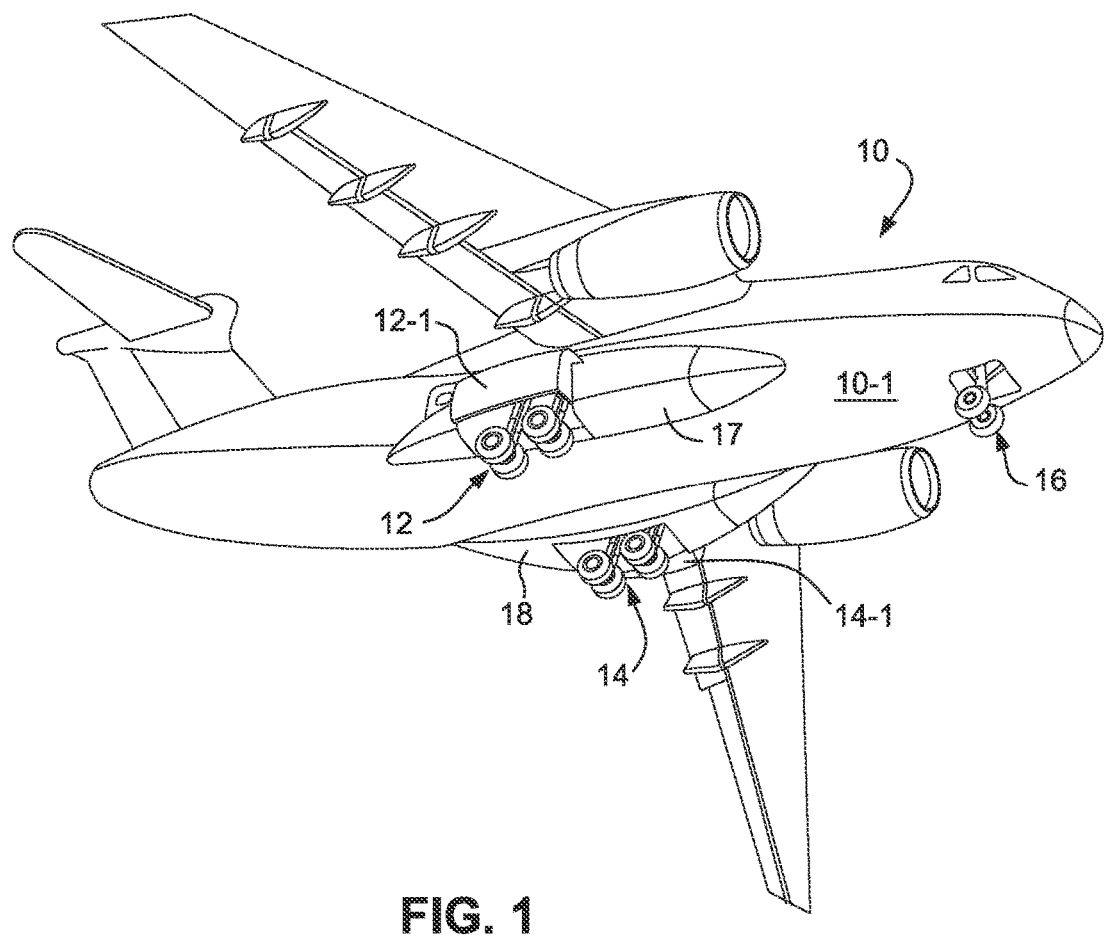
FIG. 1 is a perspective bottom view of a cargo-type aircraft equipped with retractable landing gear and gear doors that require lifting during an opening cycle.

Accompanying FIG. 1 shows an exemplary cargo-type aircraft 10 which includes retractable main landing gear assemblies 12, 14 and a retractable nose landing gear assembly 16. The main landing gear assemblies 12, 14 of the aircraft 10 are retractably housed within respective landing gear bays 17, 18 near the bottom of the aircraft's fuselage 10-1. As shown in FIG. 1, the main landing gear assemblies 12, 14 are depicted in an extended condition whereby the respective landing gear doors 12-1, 14-1 are in an opened condition. Since the landing gear bays 17, 18 are located near the bottom of the aircraft fuselage 10-1, the landing gear doors 12-1, 14-1 must be physically rotated laterally and upwardly relative to their associated landing gear bay 17, 18 in order to prevent contact with the ground during landing.

Accompanying FIGS. 2 and 3 are enlarged cross-sectional elevational views of the starboard landing gear actuation assembly 20 associated with the starboard landing gear door 12-1, it being understood that a mirror image assembly would likewise be provided with the port landing gear door 14-1. As shown, the actuation assembly 20 includes a generally U-shaped door support bracket 22 which is attached to the generally L-shaped gear door 12-1. The door support bracket 22 is connected to airframe support structure (not shown) associated with the gear door bay 17 at a hinge arm 22-1 thereof so as to be pivotally moveable about hinge axis 22-1a defined thereby. Hinged movement of the door support bracket 22 about hinge axis 22-1a will thus cause the gear door 12-1 attached thereto to be moved between a closed condition as shown in FIG. 2 and an opened condition as shown in FIG. 3. As can be appreciated, during a door opening cycle such pivotal movement of the door support bracket 22 will in turn carry the gear door 12-1 laterally outwardly and upwardly relative to the gear bay 17 posited at the bottom region of the aircraft fuselage 10-1.

The door actuation assembly 20 also includes a first fixed length linkage arm 24 having a proximal end pivotally connected to a fixed position attachment boss 26 at pivot axis 26-1. The attachment boss 26 is positionally fixed to the airframe structure of the aircraft's fuselage 10-1. A second fixed length linkage arm 30 has a proximal end pivotally connected to the first linkage arm at pivot axis 30-1 and a distal end pivotally connected to the connection boss 22-2 of door support bracket 22 at pivot axis 30-2.

An actuator assembly 40 (e.g., a hydraulic or pneumatic actuator) includes an actuator cylinder 40a having a proximal end pivotally attached to a fixed position attachment boss 44 at pivot axis 40-1. The attachment boss 44 is positionally fixed to the airframe structure of the aircraft's fuselage 10-1. The actuator 40 also includes a reciprocally rectilinearly movable actuator arm 42-2 having a distal end pivotally connected to the first linkage arm 24 at pivot point 40-2.

A back-up tension spring assembly 50 has a proximal end pivotally connected to a fixed attachment boss 52 at pivot axis 50-1 and a distal end pivotally connected to the first linkage arm 24 at pivot axis 50-2. It will be observed that the pivot axis 50-2 is located inboard relative to the aircraft fuselage and the pivot axis 40-2. It will also be observed that the tension spring assembly 50 will be force-loaded when the gear door 12-1 is moved into its closed condition as shown in FIG. 2, i.e., the tension spring assembly 50 will be stretched under tension be virtue of the linkage distance between the pivot axes 50-1 and 50-2 as compared to the compressed (non-loaded) length of the tension spring assembly 50.

In normal operation, the actuator assembly 40 can be operated by on-board systems so as to cause the actuator arm 40b to extend thereby driving the first linkage arm downwardly about the pivot axis 26-1. This movement of the first linkage arm 24 will in turn cause the second linkage arm 30 to drive the door support bracket 22, and thus the gear door 12-1 carried thereby, to be pivoted about pivot axis 22-1a (arrow A1 in FIG. 3) thereby causing articulation of the gear door support bracket 22 and its associated gear door 12-1 in a laterally outwardly and upwardly direction (arrow A2 in FIG. 3).

As can be seen by comparing FIGS. 2 and 3, such articulated movement of the first and second linkage arms 24, 30, respectively, will in turn cause the spring assembly 50 to be further force loaded (i.e., due to further extension between pivot axes 50-1 and 50-2) until the pivot axis 50-2 is moved over the center of pivot axis 40-2. At such moment, the spring assembly 50 will therefore begin unloading its spring force which thereby assists in pivotally driving the first linkage arm 24 downwardly about the pivot axis 26-1 thereby in turn assisting in the pivotal movement of the gear door support bracket 22 and the door 12-1 carried thereby about axis 22-1a in the direction of arrow A2 in FIG. 3. This force loading and unloading of the spring assembly 50 will thereby occur during normal operation of the gear door actuation assembly 20 to move the gear door 12-1 between its closed and opened conditions shown in FIGS. 2 and 3, respectively.

Should a failure occur in the normal on-board actuation systems (e.g., a hydraulic, electrical and/or pneumatic failure) that prevents normal operation of the actuator assembly 40 as discussed above, the flight crew may activate an emergency landing gear deployment system whereby the landing gear 12 is freed from its uplocks so as to be capable of gravity free-fall from their retracted position within the bay 17 to an extended condition. A number of emergency landing gear deployment systems are known in the art so as to achieve the correct gravity free fall sequencing of the gear doors 12-1, 14-1 and their associated landing gear 12, 14, respectively, i.e., so as to ensure that the gear doors 12-1, 14-1 are opened before the landing gear 12, 14 are deployed to thereby minimize if not prevent entirely the latter from striking the former (which otherwise might possibly cause jamming of the gear thereby preventing full gear deployment). One such system that may be operatively interconnected with the door actuation system 20 as described above is disclosed in U.S. Patent Application Publication No. 2015/0151832 (the entire content of which is expressly incorporated hereinto by reference).

Thus, should failure of the normal gear extension system occur, a gravity free fall of the landing gear 12, 14 and their respective landing gear doors 12-1, 14-1 may be initiated by an on-board emergency gear actuating system (not shown). For example, during a gravity free fall event, the first linkage arm will be moved pivotally downward about the first pivot axis 26-1 which will in turn cause the pivot axis 50-2 associated with the force-loaded tension spring assembly 50 to be moved over the center of the pivot axis 40-2. Movement of the force-loaded tension spring assembly 40 over the center of the pivot axis 40-2 will thereby allow the force of the spring assembly 50 to unload and provide sufficient reserve force to pivotally drive the gear door support bracket 22 and the gear door 12-1 carried thereby about pivot point 22-1a. Once this movement of the gear door 12-1 occurs whereby it no longer presents an obstacle to the landing gear 12, the on-board emergency gear actuating system may then allow the landing gear 12 to be deployed by gravity free fall.

The graph of FIG. 4 shows the calculation of required torque necessary to lift the gear door 12-1 during a door opening cycle (solid line), in cooperation with the torque generated by the backup system door actuation system 20 (dashed line) using the hinge line axis as reference for this calculation. The optimized geometry of the door actuation system 20 results in a generated torque curve that is substantially parallel to the required torque curve, providing an optimization of the available energy of the system.

The graph of FIG. 5 shows the calculation of resultant torque in the door hinge line axis, taking into account the difference between required and generated torque. As can be seen, the positive torque result depicted in FIG. 5 means that the gear door 12-1 will be provided with an additional force load in the opening direction.

Various modifications within the skill of those in the art may be envisioned. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A retractable aircraft landing gear door actuation mechanism comprising:

a landing gear door;

a door support bracket attached to the landing gear door, the support bracket being attached to aircraft structure for pivotal movement about a pivot axis between a closed condition whereby the landing gear door covers an aircraft landing gear when retracted relative to the aircraft structure, and an opened condition whereby the landing gear door is moved laterally and upwardly relative to the aircraft landing gear when extended relative to the aircraft structure; and a gear door actuation assembly operatively connected to the door support bracket for moving the door support bracket and the gear door supported thereby between the closed and opened conditions thereof, wherein the gear door actuation assembly includes an over-the-center spring assembly which assists in pivotal movement of the door support bracket and the gear door supported thereby from the closed condition into the opened condition thereof, wherein the over-the center spring assembly comprises:

(i) first and second linkage arms, wherein the first linkage arm is pivotally connected at a proximal end thereof to the aircraft structure at a first pivot axis and being pivotally connected at a distal end thereof to a proximal end of the second linkage arm at a second pivot axis, and wherein the second linkage arm is pivotally connected at a distal end thereof to the gear door support structure at a third pivot axis;

(ii) an actuator assembly having a proximal end pivotally connected to the aircraft structure at a fourth pivot axis and having a distal end pivotally connected to the first linkage arm at a fifth pivot axis between the first and second pivot axes thereof; and (iii) a tension spring assembly having a proximal end pivotally connected to the aircraft structure at a sixth pivot axis and a distal end pivotally connected to the first linkage arm at a seventh pivot axis positioned inboard of the fifth pivot axis, wherein (iv) the tension spring assembly is loaded with a tension force when the gear door support bracket and the gear door supported thereby is in the closed condition thereof, and wherein (v) actuation of the actuator assembly pivotally drives the first linkage arm about the first pivot axis to cause the second linkage arm to drive the door support bracket and the gear door supported thereby to pivot laterally and outwardly relative to the relative to the aircraft landing gear and into the opened condition thereof; and wherein (vi) movement of the door support bracket and the gear door supported thereby responsively moves the seventh pivot axis over center of the fifth pivot axis to thereby cause the force of the tension spring assembly to unload and assist in movement of the door support bracket and the gear door supported thereby into the opened condition thereof.

2. The retractable aircraft landing gear door actuation mechanism as in claim 1, wherein the gear door is generally L-shaped.

3. The retractable aircraft landing gear door actuation mechanism as in claim 1, wherein the gear door support bracket is generally U-shaped.

4. The retractable aircraft landing gear door actuation mechanism as in claim 1, wherein the actuator assembly includes an actuator assembly having a proximal end pivotally connected to the aircraft structure at the fourth pivot axis, and an actuator arm having a distal end pivotally connected to the fifth pivot axis.

5. An aircraft comprising:
a fuselage;
port and starboard landing gear bays at a bottom of the fuselage,
port and starboard retractable landing gear assemblies positioned operatively within the port and starboard retractable landing gear bays;
port and starboard landing gear door assemblies operatively associated with the port and starboard landing gear bays, the port and starboard landing gear door assemblies being moveable between closed and opened conditions in response to the port and starboard landing gear assemblies being retracted into and extended from the port and starboard landing gear bays, respectively; and
retractable aircraft landing gear door actuation mechanisms operatively associated with the port and starboard landing gear door assemblies, wherein each of the landing gear door actuation mechanisms comprises:
(a) a landing gear door;
(b) a door support bracket attached to the landing gear door, the support bracket being attached to aircraft structure for pivotal movement about a pivot axis between a closed condition whereby the landing gear door covers an aircraft landing gear when retracted relative to the aircraft structure, and an opened condition whereby the landing gear door is moved laterally and upwardly relative to the aircraft landing gear when extended relative to the aircraft structure; and
(c) a gear door actuation assembly operatively connected to the door support bracket for moving the door support bracket and the gear door supported thereby between the closed and opened conditions thereof, wherein
(d) the gear door actuation assembly includes an over-the-center spring assembly which assists in pivotal movement of the door support bracket and the gear door supported thereby from the closed condition into the opened condition thereof, and wherein the over-the-center spring assembly comprises:
(i) first and second linkage arms, wherein the first linkage arm is pivotally connected at a proximal end thereof to the aircraft structure at a first pivot axis and being pivotally connected at a distal end thereof to a proximal end of the second linkage arm at a second pivot axis, and wherein the second linkage arm is pivotally connected at a distal end thereof to the gear door support structure at a third pivot axis;
(ii) an actuator assembly having a proximal end pivotally connected to the aircraft structure at a fourth pivot axis and having a distal end pivotally connected to the first linkage arm at a fifth pivot axis between the first and second pivot axes thereof; and
(iii) a tension spring assembly having a proximal end pivotally connected to the aircraft structure at a sixth pivot axis and a distal end pivotally connected to the first linkage arm at a seventh pivot axis positioned inboard of the fifth pivot axis, wherein
(iv) the tension spring assembly is loaded with a tension force when the gear door support bracket and the gear door supported thereby is in the closed condition thereof, and wherein
(v) actuation of the actuator assembly pivotally drives the first linkage arm about the first pivot axis to cause the second linkage arm to drive the door support bracket and the gear door supported thereby to pivot laterally and outwardly relative to the aircraft landing gear and into the opened condition thereof; and wherein
(vi) movement of the door support bracket and the gear door supported thereby responsively moves the seventh pivot axis over center of the fifth pivot axis to thereby cause the force of the tension spring assembly to unload and assist in movement of the door support bracket and the gear door supported thereby into the opened condition thereof.

6. The aircraft as in claim 5, wherein the gear door is generally L-shaped.

7. The aircraft as in claim 5, wherein the gear door support bracket is generally U-shaped.

8. The aircraft as in claim 5, wherein the actuator assembly includes an actuator assembly having a proximal end pivotally connected to the aircraft structure at the fourth pivot axis, and an actuator arm.

* * * * *